United States Patent
Ishikawa et al.

(10) Patent No.: US 11,365,320 B2
(45) Date of Patent: Jun. 21, 2022

(54) LIQUID POLYMERIZABLE COMPOSITION COMPRISING CHAIN-GROWTH AND STEP-GROWTH POLYMERIZATION MONOMERS AND INORGANIC NANOPARTICLES DISPERSED THEREIN, AND ITS USE TO MANUFACTURE AN OPTICAL ARTICLE

(71) Applicants: ESSILOR INTERNATIONAL, Charenton-le-Pont (FR); NIKON CORPORATION, Tokyo (JP)

(72) Inventors: Akira Ishikawa, Tokyo (JP); Ludovic Ferrigno, Tokyo (JP); Akiko Miyakawa, Tokyo (JP)

(73) Assignees: Essilor International, Charenton-le-Pont (FR); Nikon Corporation, Tokyo (JP)

( * ) Notice: Subject to any disclaimer, the term of this patent is extended or adjusted under 35 U.S.C. 154(b) by 251 days.

(21) Appl. No.: 16/060,718

(22) PCT Filed: Dec. 18, 2015

(86) PCT No.: PCT/IB2015/002556
§ 371 (c)(1),
(2) Date: Jun. 8, 2018

(87) PCT Pub. No.: WO2017/103640
PCT Pub. Date: Jun. 22, 2017

(65) Prior Publication Data
US 2018/0362772 A1 Dec. 20, 2018

(51) Int. Cl.
| | |
|---|---|
| *C08F 220/56* | (2006.01) |
| *C09D 4/00* | (2006.01) |
| *C09D 133/24* | (2006.01) |
| *C08F 220/54* | (2006.01) |
| *C09D 7/61* | (2018.01) |
| *C09D 7/40* | (2018.01) |
| *C08K 3/30* | (2006.01) |
| *C09D 133/26* | (2006.01) |
| *G02B 1/10* | (2015.01) |
| *C08K 3/22* | (2006.01) |

(52) U.S. Cl.
CPC ............. *C09D 4/00* (2013.01); *C08F 220/54* (2013.01); *C08F 220/56* (2013.01); *C08K 3/30* (2013.01); *C09D 7/61* (2018.01); *C09D 7/67* (2018.01); *C09D 133/24* (2013.01); *C09D 133/26* (2013.01); *G02B 1/10* (2013.01); *C08F 2800/20* (2013.01); *C08K 2003/2244* (2013.01); *C08K 2003/2296* (2013.01); *C08K 2003/3036* (2013.01); *C08K 2201/011* (2013.01)

(58) Field of Classification Search
CPC .............. C08K 3/30; C08K 2003/2296; C08K 2003/2244; C08K 2003/3036; C09D 133/26; C08J 220/56; C08J 220/54
See application file for complete search history.

(56) References Cited

U.S. PATENT DOCUMENTS

| | | |
|---|---|---|
| 7,070,862 B1 | 7/2006 | Miyakawa et al. |
| 7,547,467 B2 | 6/2009 | Olson et al. |
| 9,914,807 B2* | 3/2018 | Stiegman ............... C08G 77/60 |
| 10,577,484 B2* | 3/2020 | Lee ......... C09K 11/02 |
| 2009/0047531 A1 | 2/2009 | Bartley et al. |
| 2016/0005932 A1* | 1/2016 | Lee ......... C09K 11/70 257/98 |
| 2016/0289395 A1* | 10/2016 | Stiegman ............... C08G 79/00 |
| 2018/0273713 A1* | 9/2018 | Lyons ..................... C08J 7/043 |

FOREIGN PATENT DOCUMENTS

| | | |
|---|---|---|
| CN | 102208556 A | 10/2011 |
| EP | 2 586 826 A1 | 5/2013 |
| EP | 2 781 535 A1 | 9/2014 |
| JP | 2013003006 A | 1/2013 |
| JP | 2015-155551 A | 8/2015 |
| JP | 2016-204401 A | 12/2016 |
| WO | 2013/003010 A1 | 1/2013 |
| WO | 2013/073364 A1 | 5/2013 |
| WO | 2014/001404 A1 | 1/2014 |
| WO | 2015/092048 A1 | 6/2015 |
| WO | 2015/092466 A1 | 6/2015 |
| WO | 2015/186521 A1 | 12/2015 |

OTHER PUBLICATIONS

International Search Report, dated May 6, 2016, from corresponding PCT/IB2015/002556 application.

* cited by examiner

Primary Examiner — Margaret G Moore
(74) Attorney, Agent, or Firm — Nixon & Vanderhye

(57) ABSTRACT

Disclosed is a liquid polymerizable composition including a chain-growth polymerization dispersing monomer, a step-growth polymerization monomer system and inorganic nanoparticles homogeneously dispersed in the monomers, as well as its use for the preparation of a transparent polymeric material having a high refractive index and low haze and its use in the optical field.

19 Claims, No Drawings

LIQUID POLYMERIZABLE COMPOSITION COMPRISING CHAIN-GROWTH AND STEP-GROWTH POLYMERIZATION MONOMERS AND INORGANIC NANOPARTICLES DISPERSED THEREIN, AND ITS USE TO MANUFACTURE AN OPTICAL ARTICLE

The present invention relates to a liquid polymerizable composition as well as its use for the preparation of a transparent polymeric material having a high refractive index and low haze value and its use in the optical field.

The liquid polymerizable composition of the present invention comprises a chain-growth polymerization dispersing monomer, a step-growth polymerization monomer system and inorganic nanoparticles homogeneously dispersed in said monomers.

In the last ten years, it has become more and more difficult to synthesize materials which have a refractive index higher than 1.6 as well as the other properties required in optical field (transparency i.e. high transmittance with low haze value, mechanical properties like shock resistance and abrasion resistance, optical properties including no optic distortion and high contrast, heat resistance, small shrinkage, chemical resistance . . . ) from pure organic monomers.

One solution to overcome this problem is to introduce inorganic nanoparticles into the monomer composition in order to increase its refractive index. Typically, nanoparticles having a refractive index from 2.1 to 3 may be chosen among $ZrO_2$, $TiO_2$, $BaTiO_3$ or $ZnS$. However, with classical monomers having a refractive index around 1.5-1.6 (such as methylmethacrylate or styrene), the amount of nanoparticles required to achieve a high refractive index can be above 50% w/w, which leads to aggregation of the nanoparticles and adversely increases the haze value and reduces the transmittance of the resulting material. Furthermore, it renders the material very brittle.

Preventing the aggregation of nanoparticles can be solved in different ways, for example by improving the chemical compatibility of nanoparticles with monomers or by inhibiting aggregation dynamics of nanoparticles within the monomer matrix.

For example, surface treatment of the nanoparticles with a polymer improves the chemical compatibility of nanoparticles and monomers by shielding the nanoparticles from attractive van der Waals forces as disclosed in Demir et al., *Macromolecules,* 2007, 40, 1089-1100. However, this solution is not satisfying because the covalent grafting of organic molecules on nanoparticles reduces the effective refractive index of the resulting particles.

Another solution is to disperse the nanoparticles with monomers bearing a chemical function that is able to interact in a non-covalent way with the nanoparticles, for example by Hydrogen bonding. Dispersing monomers typically comprise a double bond for polymerization purposes and a dispersing function such as hydroxy, amide, phosphine oxide, phosphine sulphide, anhydride, thioamide, as disclosed in copending patent applications PCT/EP2013/063423, PCT/IB2013/003006 and PCT/IB2013/003010 in the name of the Applicants.

However, the use of a dispersing monomer may not be sufficient to obtain optical articles having both a high refractive index, i.e. above 1.56, and a low haze value, i.e. value lower than 6%, preferably lower than 2.5%, more preferably lower than 1% at 545 nm. Indeed, during the polymerization, forces aggregating nanoparticles (the depletion-attraction forces) appear along with the polymer chain-growth. The higher the polymer molecular weight, the stronger the aggregation forces. Since this aggregation mechanism is thermodynamically stabilizing the system, it is impossible to prevent it without major qualitative and quantitative modifications of components.

The inventors have found that adding a step-growth polymerization monomer system to the dispersing monomer and the nanoparticles is efficient to control the polymerization mechanism by lowering the entropic penalty due to the growth of the polymer chains that destabilizes the nanoparticles dispersed therein and forces them to aggregate. Indeed, contrary to chain-growth polymerization, step-growth polymerization is advantageously characterized by the fact that the molecular weight of the polymer increases slowly at low conversion. As such, it is only at high conversion (i.e. higher than 95%) that long polymer chains are obtained. Therefore, the attraction-depletion forces, and thus the aggregation of nanoparticles, remain relatively low during the major part of the polymerization. Additionally, the rise of molecular weight at high conversion is rapid and freezes the system in a dispersed state, thereby avoiding aggregation of the nanoparticles.

Thiol-ene polymerization is known to proceed via a step-growth mechanism and is particularly adapted to be added to a composition comprising an alkene-type dispersing monomer as described above. As such, the step-growth polymerization monomer system that is used in the present invention comprises a polyene monomer and a polythiol monomer.

The inventors have thus developed a polymerizable composition based on three different monomers within which inorganic nanoparticles are homogeneously dispersed. Said nanoparticles have the advantage that they can be added into the composition in large amounts (up to 80% w/w) with a very good dispersibility and stability. The presence of said nanoparticles in the composition increases the refractive index of the resulting polymerized material obtained after curing the composition. Said material is able to show excellent optical properties, such as a refractive index higher than 1.56, and a haze value at 545 nm lower than 6%, preferably lower than 2.5%, more preferably lower than 1%.

Therefore, an object of the present invention is a liquid polymerizable composition comprising:
  a chain-growth polymerization dispersing monomer comprising one or two C=C bond(s),
  inorganic nanoparticles dispersed in the composition;
wherein said polymerizable composition further comprises a step-growth polymerization monomer system comprising a polyene monomer and a polythiol monomer.

A second object of the present invention is an optical article comprising:
  an optical substrate, and
  a coating obtained by curing of the liquid polymerizable composition of the present invention.

Yet another object of the present invention is an optical article obtained by curing the liquid polymerizable monomer composition of the present invention.

Finally, a fourth object of the present invention is the use of a step-growth polymerization monomer system comprising a polyene monomer and a polythiol monomer for increasing the refractive index and/or decreasing the haze value of a polymeric material obtained by curing a liquid composition comprising:
  a chain-growth polymerization dispersing monomer comprising one or two C=C bond(s),
  inorganic nanoparticles dispersed therein.

DETAILED DESCRIPTION

Chain-Growth Polymerization Dispersing Monomer

The liquid polymerizable composition of the present invention comprises a chain-growth polymerization dispersing monomer that comprises one or two C=C bond(s).

According to the present invention, a "chain-growth polymerization dispersing monomer" means a monomer that polymerizes by chain-growth reaction mechanism and that comprises a functional group that is able to disperse inorganic nanoparticles via non-covalent interactions. Growth of the polymer chain via chain-growth polymerization typically proceeds via addition of one monomer at a time at only one end of the polymer chain.

In the context of the present invention, a C=C bond means a double bond between two carbon atoms.

The one or two C=C bonds of the chain-growth polymerization dispersing monomer may be included in functional groups conventionally used in chain growth polymerization, such as (meth)acrylic monomers.

According to a preferred embodiment, the chain-growth polymerization dispersing monomer that comprises one or two C=C bond(s) further comprises at least one functional group able to establish Hydrogen-bonding with inorganic nanoparticles, in particular a group selected from hydroxy, amide, thioamide, phosphine oxide, phosphine sulphide, anhydride, thioanhydride, imide, 1,3-diketone, carbamate, thiocarbamate, carbamide, thiocarbamide, dithiocarbonate, and mixtures thereof, more particularly a hydroxy or amide group.

Without wishing to be bound by theory, it is believed that the functional group that is able to establish H-bonding with the nanoparticles helps to disperse the nanoparticles homogenously within the liquid polymerizable composition of the present invention.

According to a particular embodiment, the chain-growth polymerization dispersing monomer does not comprise any silicium atoms.

According to another particular embodiment, the chain-growth polymerization dispersing monomer does not comprise a carboxylic acid group. Indeed, a carboxylic acid group may react with inorganic nanoparticles and lead to covalent grafting and thus reduce the refractive index of the nanoparticles.

In a particularly preferred embodiment, the chain-growth polymerization dispersing monomer comprises an acrylate group ($CH_2$=CH—COO—), a methacrylate group ($CH_2$=C($CH_3$)—COO—), an acrylamide group ($CH_2$=CH—CON—) or a methacrylamide group ($CH_2$=C($CH_3$)—CON—), an acrylic thioester group ($CH_2$=CH—COS—) or a methacrylic thioester group ($CH_2$=C($CH_3$)—COS—). Said groups may or may not be distinct from the one or two C=C bonds of the chain-growth polymerization and/or the at least one functional group able to establish Hydrogen-bonding with inorganic nanoparticles as defined above.

Examples of suitable chain-growth polymerization dispersing monomers having at least one functional group selected from hydroxy, amide and thioamide are 2-hydroxyethyl methacrylate (HEMA), 2-hydroxy-3-phenoxypropyl acrylate (HPPA), acrylamide, N,N-dimethylacrylamide (NNDMAA), N,N-dimethylacrylthioamide, N-(hydroxymethyl)acrylamide, N,N-diethylacrylamide, N-methylphenylacrylamide, methacrylamide, N,N-dimethylmethacrylamide, and mixtures thereof.

Examples of suitable chain-growth polymerization dispersing monomers having at least one functional group selected from phosphine oxide and phosphine sulphide are disclosed in patent application PCT/EP2013/063423.

Examples of suitable chain-growth polymerization dispersing monomers having at least one functional group selected from anhydride, thioanhydride, imide and 1,3-diketone are disclosed in patent application PCT/IB2013/003006.

Examples of suitable chain-growth polymerization dispersing monomers having at least one functional group selected from carbamate, thiocarbamate, carbamide, thiocarbamide and dithiocarbonate are disclosed in patent application PCT/IB2013/003010.

According to a preferred embodiment, the chain-growth polymerization dispersing monomer is 2-hydroxyethyl methacrylate (HEMA), 2-hydroxy-3-phenoxypropyl acrylate (HPPA) or N,N-dimethylacrylamide (NNDMAA), preferably NNDMAA.

The chain-growth polymerization dispersing monomers used in the composition of the present invention may be synthetized according to methods described in patent applications PCT/EP2013/063423, PCT/IB2013/003006 and PCT/IB2013/003010, or are commercially available, such as 2-hydroxyethyl methacrylate (HEMA), 2-hydroxy-3-phenoxypropyl acrylate (HPPA), acrylamide, N,N-dimethylacrylamide (NNDMAA), N-(hydroxymethyl)acrylamide, N,N-diethylacrylamide, N-methylphenylacrylamide, methacrylamide, N,N-dimethylmethacrylamide, methacrylic anhydride and acrylic anhydride.

The liquid polymerizable composition of the invention may comprise only one chain-growth polymerization dispersing monomer or a mixture of chain-growth polymerization dispersing monomers.

The amount of chain-growth polymerization dispersing monomer in the polymerizable composition is from 10% to 60%, preferably 15% to 50%, more preferably 30% to 45%, by weight based on the weight of the composition.

Inorganic Nanoparticles

The liquid polymerizable composition of the present invention comprises inorganic nanoparticles. Said inorganic nanoparticles are homogeneously dispersed in the liquid polymerizable composition of the present invention, i.e. they do not form aggregates having a size higher than 100 nm, as measured by transmission electron microscopy. A homogeneous dispersion of nanoparticles advantageously provides a composite material whose haze value at 545 nm after curing is below 6%, preferably below 2.5%, more preferably below 1%, as measured according to Japanese Industrial Standard No. K 7136-2000. Furthermore, the composite material is transparent.

The inorganic nanoparticles may be selected from metal oxides and metal sulphides, preferably zinc sulphide (ZnS) and zirconia ($ZrO_2$).

According to a specific embodiment, the inorganic nanoparticles are introduced as such in the composition. Therefore, the inorganic nanoparticles are not coated or capped prior to their introduction in the composition and they are not covalently grafted to any monomer during polymerization.

In other embodiments, the inorganic particles are coated or capped, for example by covalently grafting a surface treatment agent, prior to their introduction in the composition and they are not covalently grafted to any monomer during polymerization.

In specific embodiments, the inorganic particles are coated or capped, for example by covalently grafting a surface treatment agent comprising a polymerizable group, prior to their introduction in the composition and they are covalently grafted to a monomer of the liquid polymerizable composition during polymerization.

According to a specific embodiment, the inorganic nanoparticles are not in the form of a hydrolyzable metallic alkoxylate, such as tetralkoxyzirconiums.

The nanoparticles can be synthetized according to methods well known by the person skilled in the art, or be commercially available in the form of powder or a suspension in a solvent, such as methanol.

For instance, $ZrO_2$ nanoparticles in suspension in methanol with a particle size of 3 nm are marketed by Sakai chemical under the commercial name SZR-M.

For instance, ZnS nanoparticles are prepared according to patent application WO2014001404.

According to the invention, the "particle size" is the diameter of the highest population of particles as measured with dynamic light scattering (DLS) for instance by using Horiba SZ-100 size measurement instrument.

The particle size of the inorganic nanoparticles is preferably less than 50 nm, more preferably from 3 to 30 nm. This size range allows limitation of haze value in the final polymerized material.

Typically, the refractive index of the nanoparticles is as follows:
 ZnS, spharelite, cubic, n(589 nm)=2.3691 (Landolt-Bornstein Numerical Data and Functional Relationships in Science and Technology, III/30A, High Frequency Properties of Dielectric—Crystals. Piezooptic and Electrooptic Constants, Springler-Verlag, Berlin 1996);
 $ZrO_2$, tetragonal, ordinary ray: n(589 nm)=2.20 (Polymer Journal, 2008, 40, 1157-1163).

The particle size of the ZnS nanoparticles is less than 10 nm, preferably from 3 nm to 6 nm. This size range allows limitation of haze value in the final polymerized material.

The nanoparticles of ZnS have a crystal size comprised from 3 to 10 nm, more preferably from 3 to 6 nm. The crystal size can be determined by XR diffraction according to the Williamson-Hall method.

The amount of inorganic nanoparticles in the polymerizable composition is set according to a balance between the high refractive index and the viscosity of the composition. As such, the amount of inorganic nanoparticles in the polymerizable composition ranges from 10% to 80%, in particular from 15 to 75%, more particularly from 20 to 70%, by weight based on the weight of the composition. Indeed, adding more than 15%, preferably more than 20%, by weight of inorganic particles advantageously increases the refractive index of the composition compared to an amount of inorganic particles lower than 15% by weight. Moreover, compositions comprising less than 75%, preferably less than 70% by weight of inorganic particles are preferred because their viscosity renders them easy to handle and homogenize.

Step-Growth Polymerization Monomer System

The liquid polymerizable composition of the present invention comprises a step-growth polymerization monomer system that comprises a polyene monomer and a polythiol monomer.

According to the present invention, a "step-growth polymerization monomer system" is a combination of at least two monomers that polymerize by step-growth reaction mechanism. Growth of the polymer chain via step-growth polymerization typically proceeds via reaction of the monomers to form first dimers, then trimers, followed by longer oligomers and eventually long polymer chains.

Polythiol Monomer

The polythiol monomer is a compound that comprises more than one thiol (—SH) group. Preferably, the polythiol monomer comprises two, three or four thiol groups.

The weight percentage of sulphur in the polythiol monomer is set according to a balance between the desired refractive index of the composition and the chemical stability of the polythiol monomer. As such, the weight percentage of sulphur in the polythiol monomer ranges from 25 to 80%, in particular from 30 to 75%, more particularly from 35 to 70%, based on the weight of the polythiol monomer. Indeed, use of a polythiol monomer having a weight percentage of sulphur above 30%, preferably above 35%, advantageously increases the refractive index of the composition compared to polythiol monomers having a weight percentage of sulphur below 30%. Moreover, polythiol monomers having a weight percentage of sulphur below 70% are preferred because they are stable to heating and thus easy to handle and to polymerize.

Advantageously, the refractive index of the polythiol monomer is higher than 1.50, in particular higher than 1.55, as determined according to a measure with a refractometer or a calculation with a chemical software like ChemSkecth from ACD/Labs. It is indeed preferable to select monomers that have a relatively high refractive index so as to not lose the benefit of the high refractive index brought by the inorganic nanoparticles.

According to a particular embodiment, the polythiol monomer does not comprise any silicium atoms.

According to another particular embodiment, the polythiol monomer does not comprise a carboxylic acid group.

According to a preferred embodiment, the polythiol monomer is selected in the group consisting of methanedithiol; 1,2-ethanedithiol; 1,1-propanedithiol; 1,2-propanedithiol; 2,2-propanedithiol; 1,3-propanedithiol; 1,4-butanedithiol; 1,2-butanedithiol; 1,5-pentanedithiol; 1,6-hexanedithiol; 1,8-octanedithiol; 2,2'-oxydiethanethiol; 2,2'-thiodiethanethiol; 2,2'-(ethylenedioxy)diethanethiol; hexa (ethylene glycol) dithiol; 3,6-dioxa-1,8-octanedithiol; glycol dimercaptoacetate; diethylene glycol bis(2-mercaptoacetate); dl-1,4-dithiothreitol; bis(2-mercaptoethyl) sulphide (B2MS); bis(2-mercaptoethyl)sulphone; 2,5-dimercapto-1,3,4-thiadiazole; 5-({2-[(5-mercapto-1,3,4-thiadiazol-2-yl)thio]ethyl}thio)-1,3,4-thiadiazole-2-thiol; pentaerythritol tetra(2-mercaptoacetate); trimethylolethane tris(3-mercaptopropionate); trimethylolpropane tris(3-mercaptopropionate); trimethylolpropane tris(2-mercaptoacetate); 1,4-benzenedithiol; 1,3-benzenedithiol; 1,3,5-benzenetrithiol; 3,4-dimercaptotoluene; 1,4-benzenedimethanethiol; 1,3-benzenedimethanethiol; 1,6-di(methanethiol)-3,4-dimethylphenyl; [3-(mercaptomethyl)-2,4,6-trimethylphenyl] methanethiol; 1,5-dimercaptonaphthalene; 5,7-dimercaptomethyl-1,11-dimercapto-3,6,9-trithiaundecane; 4,7-dimercaptomethyl-1,11-dimercapto-3,6,9-trithiaundecane; 4,8-dimercaptomethyl-1,11-dimercapto-3,6,9-trithiaundecane; 5-[3-(5-mercapto-1,3,4-oxadiazole-2-yl)propyl]-1,3,4-oxadiazole-2-thiol; 2,3-bis [(2-mercaptoethyl)thio]-1-propanethiol; pentaerythritol tetrakis(2-mercaptoacetate); pentaerythritol tetrakis(3-mercaproprionate); 1-(1'-mercaptoethylthio)-2,3-dimercaptopropane; 1-(2'-mercaptopropylthio)-2,3-dimercaptopropane; 1-(3'-mercaptopropylthio)-2,3-dimercaptopropane; 1-(4'-mercaptopropylthio)-2,3-dimercaptopropane; 1-(5'-mercaptopentylthio)-2,3-dimercaptopropane; 1-(6'-mercaptohexylthio)-2,3-dimercaptopropane; 1,2-bis(4'-mercaptobutylthio)-3-dimercaptopropane; 1,2-bis(5'-mercaptopentylthio)-3- mercaptopropane; 1,2-bis(6'-mercaptohexyl)-3-mercaptopropane; 1,2,3-tris(mercaptoethylthio)propane; 1,2,3-tris(3'-mercaptopropyl-thio)propane; 1,2,3-tris(2'-mercaptoethylthio)propane; 1,2,3-tris(4'-mercaptobutylthio) propane; 1,2,3-tris(6'-mercaptohexylthio)propane; 1,6-hexanethiol-1,2,3-propanetrithiol; 1,2-bis(2'-mercaptoethylthio)-3-mercaptopropane; 1,2,3-trimethylolpropane tri(thioglycolate); pentaerythritol tetra (thioglycolate); 1,2,3-trimethylolpropane tri(3-mercaproprionate); dithioglycerol; trithioglycerol; dipentaerythritol hexa(2-mercapto acetate); 3,4,5,6-tetrachloro-1,2-dimercapto benzene; compounds of formula:

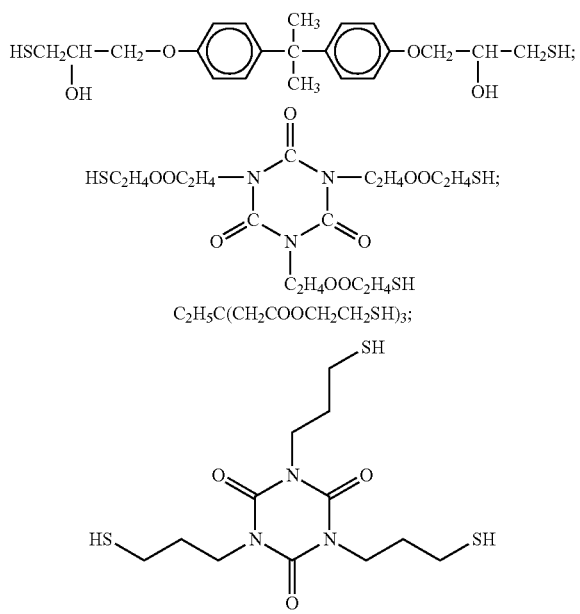

[tris-(3-mercaptopropyl)isocyanurate];
tris[2-(3-mercaptopropionyloxy)ethyl]isocyanurate;

and mixtures thereof.

Particularly preferred polythiols are selected in the group consisting of: 5,7-dimercaptomethyl-1,11-dimercapto-3,6,9-trithiaundecane; 4,7-dimercaptomethyl-1,11-dimercapto-3,6,9-trithiaundecane; 4,8-dimercaptomethyl-1,11-dimercapto-3,6,9-trithiaundecane; 1,2-ethanedithiol; bis(2-mercaptoethyl) sulphide; 1,3,5-benzenetrithiol; tris-(3-mercaptopropyl)isocyanurate; and mixtures thereof.

The liquid polymerizable composition of the invention may comprise only one polythiol monomer or a mixture of polythiol monomers.

The amount of polythiol monomer in the polymerizable composition is from 0.5 to 40%, preferably from 1.5 to 30%, more preferably from 2 to 20%, by weight based on the weight of the composition.

Polyene Monomer

The polyene monomer is a compound that comprises more than one C=C bond. Preferably, the polyene monomer comprises two, three or four C=C bonds.

According to a preferred embodiment, the polyene monomer comprises two, three or four acrylate groups, methacrylate groups, vinyl groups or allyl groups.

Advantageously, the refractive index of the polyene monomer is higher than 1.50, in particular higher than 1.55, more particularly higher than 1.60 as determined according to a measure with a refractometer or a calculation with a chemical software like ChemSkecth from ACD/Labs.

Suitable polyene monomers are known in the art as crosslinking monomers.

Examples of suitable vinylic polyenes include: divinylbenzene.

Examples of suitable allylic polyenes include: diallyl phthalate, diallyl isophthalate, diallyl cyanurate, diallyl isocyanurate, pentaerythritol diallyl ether, trimethylolpropane diallyl ether, glycerin diallyl ether, bisphenol A diallyl ether, bisphenol F diallyl ether, ethylene glycol diallyl ether, diethylene glycol diallyl ether, triethylene glycol diallyl ether, propylene glycol diallyl ether, dipropylene glycol diallyl ether and tripropylene glycol diallyl ether, 1,3,5-triallyl-1,3,5-triazine-2,4,6 (1H,3H,5H)-trione, 2,4,6-triallyloxy-1,3,5-triazine, trimethylolpropane triallyl ether, pentaerythritol triallyl ether, diallyl carbonate, di(ethylene glycol) bis(allyl carbonate), and mixtures thereof.

Examples of suitable acrylic and methacrylic polyenes include: 1,4-butanediol diacrylate (BDDA), 1,6-hexanediol diacrylate, 1,6-hexanediol dimethacrylate (HDMA), ethylene glycol diacrylate, diethylene glycol diacrylate, triethylene glycol diacrylate, polyethylene glycol diacrylate, dipropylene glycol diacrylate (DPGDA), tripropylene glycol diacrylate, ethylene glycol dimethacrylate, triethylene glycol dimethacrylate, tetraethylene glycol dimethacrylate, polyethylene glycol dimethacrylate, dipropylene glycol dimethacrylate, neopentyl glycol diacrylate, propoxylated neopentyl glycol diacrylate, glycerol diacrylate, ethoxylated glycerol diacrylate, propoxylated glycerol diacrylate, 1,1,1-trimethylolpropane triacrylate (TMPTA), 1,1,1-trimethylolpropane trimethacrylate (TMPTMA), ethoxylated 1,1,1-trimethylolpropane triacrylate, propoxylated 1,1,1-trimethylolpropane triacrylate, ethoxylated pentaerythritol triacrylate, propoxylated pentaerythritol triacrylate, pentaerythritol triacrylate (PETA), pentaerythritol trimethacrylate, 1,3,5-triacryloylhexahydro-1,3,5-triazine, tris [2-(acryloyloxy)ethyl]isocyanurate, 1,3,5-triacryloylhexahydro-1,3,5-triazine, bisphenol A diacrylate, ethoxylated bisphenol A diacrylate, bisphenol A dimethacrylate, ethoxylated bisphenol A dimethacrylate diacrylate derivatives of bisphenol S, dimethacrylate derivatives of bisphenol S, diacrylate derivatives of bisphenol S and mixtures thereof.

According to a particular embodiment, the polyene monomer is selected from divinylbenzene, 1,1,1-trimethylolpropane triacrylate (TMPTA), 1,3,5-triallyl-1,3,5-triazine-2,4,6 (1H,3H,5H)-trione, dimethacrylate derivatives of bisphenol S, diacrylate derivatives of bisphenol S and mixtures thereof.

The liquid polymerizable composition of the invention may comprise only one polyene monomer or a mixture of polyene monomers.

The amount of polyene monomer in the polymerizable composition is from 5% to 40%, in particular 10% to 35%, more particularly 15 to 30%, by weight based on the weight of the composition.

In addition, the relative composition of monomers is controlled to obtain good properties, both optically (refractive index, haze value) and mechanically (Glass Transition Temperature Tg). Groups ratio (GR) is the molar ratio of C=C bonds in the polyene monomer divided by the sum of C=C bonds in the polyene monomer and thiol groups in the polythiol monomer according to the following formula:

$$GR = \frac{C=C_{in\ polyene}}{(C=C_{in\ polyene} + SH_{in\ polythiol})}$$

wherein $C=C_{in\ polyene}$ is the number of moles of C=C bonds of the polyene monomer in the composition; and $SH_{in\ polythiol}$ is the number of moles of SH groups of the polythiol monomer in the composition.

The GR ratio is set according to a balance between step growth polymerization mechanism and final mechanical properties of the polymerized composition and ranges from 50% to 98%, in particular from 60 to 96%, more particularly from 70 to 95%. Indeed, to favor step growth polymerization (thiol-ene reaction) and avoid inorganic nanoparticles aggregation, the GR is preferably lower than 96%, more preferably lower than 95%. Moreover, to favor the reaction between the polyene and the chain-growth polymerization dispersing monomer, the GR ratio is preferably above 60%, more preferably above 70%. Indeed, such a GR ratio improves the coupling between the organic matrix and the nanoparticles thus resulting in good mechanical properties.

Additional Ingredients

The liquid polymerizable composition of the invention may comprise other ingredients typically used in polymerizable compositions, such as other monomers, a photoinitiator, a mold release agent, photostabilizer, antioxidant, dye anti-coloring agent, fillers, UV light absorber or optical brightener.

Preferably, the composition of the present invention comprises a photoinitiator which can be a photoradical initiator. A suitable photoinitiator is 1-hydroxycyclohexylphenylketone sold as Irgacure® 184 by BASF. The amount of photoinitiator in the composition may be from 0.01 to 4%, particularly 0.1 to 1.5% by weight based on the total weight of the monomers in the composition.

Optical Substrate and Article

Another object of the present invention is an optical substrate coated with the liquid polymerizable composition as previously defined.

The optical substrate may be any organic glass commonly known and used in the optical field. It may be a thermoplastic resin such as a thermoplastic polycarbonate, or a thermoset or photo-cured resin such as CR®, polyurethane or polythiourethane.

In this invention "coating" or "coat" should be construed to cover not only regular coatings but also a resin layer having a proper shape provided on a spheric or aspheric glass lens to obtain aspheric effect. Such resin layers are disclosed in U.S. Pat. No. 7,070,862.

For regular coatings, the thickness of the liquid polymerizable coating can be comprised from 1 µm to 250 µm, preferably from 2 µm to 50 µm.

For resin layers, the thickness of the liquid polymerizable coating can be comprised from 100 µm to 2000 µm, preferably from 200 µm to 1000 µm.

Another object of the present invention is an optical article comprising:
(a) an optical substrate, and
(b) a coating obtained by curing of the liquid polymerizable composition as previously defined.

The liquid polymerizable composition coating may be applied onto the optical substrate by any suitable coating method such as dip-coating, bar coating, spray coating, or spin coating, as disclosed in U.S. Pat. No. 7,070,862.

Another object of the present invention is an optical article obtained by curing the liquid polymerizable monomer composition of the present invention. The thickness of cured liquid polymerizable as bulk material can be from 0.5 mm to 3 cm.

The optical article is preferably an optical lens, such as an ophthalmic lens, sunglass lens or other optical lens for optical instrument, and most preferably an ophthalmic lens or an optical element for a camera. It may contain functional layers such as polarizing layers, anti-reflecting coatings, visible light and UV absorbing coatings, anti-choc coatings, abrasion-resistant-coating, anti-smudge-coating, anti-fog coating, anti-dust coating, photochromic coatings, all of which are familiar to the skilled person.

The curing of the polymerizable composition of the present invention may be carried out by subjecting the composition to UV light and/or heat, preferably to UV light first and then to heat.

Another object of the present invention is the use of a step-growth polymerization monomer system comprising a polyene monomer and a polythiol monomer for increasing the refractive index and/or decreasing the haze value of a polymeric material obtained by curing a liquid composition comprising:
a chain-growth polymerization dispersing monomer comprising one or two C=C bond(s),
inorganic nanoparticles dispersed therein.

The invention will now be further described in the following examples. These examples are offered to illustrate the invention and should in no way be viewed as limiting the invention.

EXAMPLES

Figures
Materials
In the examples, the following compounds are used:
Inorganic Nanoparticles:
ZnS nanoparticles are prepared according to patent application WO2014001404, experiment 2.
Chain-Growth Polymerization Dispersing Monomer:
N,N-dimethylacrylamide (NNDMAA), available from Sigma-Aldrich;
Polyene Monomer:
MY CURE 160, a diacrylate derivative of bisphenol S, available from YukaDenshi Co., Ltd.;
Polythiol Monomer:
bis(2-mercaptoethyl) sulphide (B2MS)

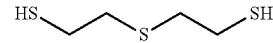

available from Sigma-Aldrich.
Photoinitiator:
1-hydroxycyclohexylphenylketone sold as Irgacure® 184 by BASF.
Methods
The refractive index at 594 nm ($RI^{594\ nm}$) of the cured material was measured using a Metricon 2010M (prism coupling method).
The transmittance at 400 nm ($T^{400\ nm}$) was measured with a spectrophotometer UV-Vis (Hitachi U-4100).
Haze value was measured with a spectrophotometer UV-Vis (Hitachi U-4100) according to Japanese Industrial Standard No 7136-2000 (equivalent to ISO 14782-1999) and is calculated with the following formula:

$$(\text{Haze})(\%) = \frac{T_4}{T_2} \times 100 - \frac{T_3 \times T_2}{T_1}$$

wherein:
- $T_1$=transmitted light measured by the spectrophotometer without sample (100%);
- $T_2$=transmitted light measured by the spectrophotometer with sample;
- $T_3$=front scattered light measured by the spectrophotometer without sample;
- $T_4$=front scattered light measured by the spectrophotometer with sample.

1) General Experimental Protocol for the Preparation of Liquid Polymerizable Compositions According to the Present Invention and their Photocuring to Obtain an Optical Article.

In a 5 mL sealable and UV cut flask equipped with dispersing means (magnetic stirrer and ultrasonic source), the chain-growth polymerization dispersing monomer is introduced. The following compounds were then introduced in order:
1) inorganic nanoparticles,
2) polyene monomer,
3) polythiol monomer,
4) photoinitiator.

The mixture was stirred for 2-3 min at room temperature until a transparent composition is obtained.

The obtained compositions were applied between two glass plates separated by a silicon spacer of 500 μm. Photocuring was carried out by exposition at 50% of the 200 W of power of the SP-9 mercury lamp for 600 sec. The diffuser of the lamp is at a distance of 2 mm with the top glass plate of the mold. This corresponds to an irradiation power of 60 mW/cm².

The resulting polymeric material is heated in an oven with the following temperature profile:
- from room temperature to 80° C. in 30 min;
- 2 hours at 80° C.;
- from 80° C. to 30° C. in 30 minutes.

2) Influence of the Quantities of Polyene Monomer and Polythiol Monomer on the Optical Properties of the Resulting Articles Compositions 1-5 were prepared according to the experimental protocol of example 1 and comprise the ingredients listed in Table 1 as well as photoinitiator Irgacure® 184 which is introduced at 0.5% by weight based on the total weight of monomers.

Groups ratio (GR) is the molar ratio of insaturated C=C bonds in polyene monomer divided by the sum of insaturated C=C bond in polyene monomer and thiol groups in polythiol monomer. This ratio takes into account the functionality and molecular weight of monomers involved in step growth polymerization.

TABLE 1

Composition (% by weight based on the weight of the composition)

| Sample | Nano-particles ZnS | Chain-growth polymerization dispersing monomer NNDMAA | Polyene monomer MY CURE 160 | Polythiol monomer B2MS | Groups ratio GR |
|---|---|---|---|---|---|
| 1 (invention) | 25 | 42 | 24 | 9 | 51% |
| 2 (invention) | 25 | 42 | 27 | 6 | 64% |
| 3 (invention) | 25 | 42 | 31 | 2 | 86% |
| 4 (invention) | 25 | 42 | 32.3 | 0.7 | 95% |
| 5 (comparative) | 25 | 42 | 33 | 0 | 100% |

The optical properties measured on Samples 1-5 are gathered in Table 2 below.

TABLE 2

| Sample | RI 594 nm | Abbe No. | T400 nm (%) | Haze value (%) 390 nm | 435 nm | 545 nm | 655 nm | Glass transition temperature (Tg, ° C.) |
|---|---|---|---|---|---|---|---|---|
| 1 | 1.59 | 35 | 86 | 2.4 | 2.1 | 1.8 | 1.7 | 20.9 |
| 2 | 1.59 | 35 | 84 | 1.6 | 1.4 | 1.2 | 1.0 | 40.7 |
| 3 | 1.59 | 35 | 82 | 1.3 | 1.1 | 0.8 | 0.8 | 65 |
| 4 | 1.58 | 35 | 77 | 6.5 | 5.8 | 5.1 | 4.6 | 74.8 |
| 5 | 1.58 | 34 | 9 | 97.8 | 91.7 | 47.6 | 19.3 | 71.7 |

Sample 5, which does not comprise any polythiol, has a much lower transmittance and a much higher haze value than the compositions according to the present invention. This shows that adding polythiol increases the ratio of step-growth polymerization which is good for preventing the nanoparticles aggregation and therefore minimizing haze value. The haze value can be lowered if a higher irradiation power is used during the curing, due to fastening of the polymerization kinetics.

A small amount of polythiol monomer has a strong effect on optical properties, as shown by sample 4, whose haze value at 545 nm is below 6%. Best results are obtained with polythiol content from 2% to 9%, for haze value below 2.5% over the whole visible light range from 390 nm to 655 nm, sometimes lower than 1% for samples of 500 μm thickness. For thinner coatings, haze value would be lower.

However, with the larger polythiol concentration (lower GR ratios), reticulation of polyene with polyacrylate is weaker and mechanical properties (shown with glass transition temperature) are lower. Example 3 shows a good compromise between optical and mechanical properties for a 500 µm thick material.

The invention claimed is:

1. A liquid polymerizable composition which after curing can be used as a transparent optical material, said liquid polymerizable composition comprising:
   a chain-growth polymerization dispersing monomer comprising one or two C=C bond(s),
   inorganic nanoparticles dispersed therein;
   wherein said polymerizable composition further comprises a step-growth polymerization monomer system comprising a polyene monomer and a polythiol monomer,
   wherein the molar ratio of C=C bonds in the polyene monomer divided by the sum of C=C bond in the polyene monomer and thiol groups in the polythiol monomer is above 60% and below 95%,
   wherein after curing, said composition is transparent and exhibits a haze value at 545 nm that is lower than 1%,
   wherein the inorganic nanoparticles are chosen from zinc sulphide and zirconia,
   wherein the amount of inorganic nanoparticles in the polymerizable composition is at least 20%, by weight based on the weight of the composition, and
   wherein the amount of the chain-growth polymerization dispersing monomer is from 30 to 45%, by weight based on the weight of the composition.

2. The liquid polymerizable composition according to claim 1, wherein the weight percentage of sulphur in the polythiol monomer is from 25 to 80%.

3. The liquid polymerizable composition according to claim 1, wherein the refractive index of the polythiol monomer is higher than 1.50.

4. The liquid polymerizable composition according to claim 1, wherein the polythiol monomer comprises two, three or four thiol groups.

5. The liquid polymerizable composition according to claim 1, wherein the polyene monomer comprises two, three or four C=C bonds.

6. The liquid polymerizable composition according to claim 1, wherein the polyene monomer comprises two, three or four acrylate groups, methacrylate groups, vinyl groups or allyl groups.

7. The liquid polymerizable composition according to claim 1, wherein the chain-growth polymerization dispersing monomer further comprises at least one functional group able to establish Hydrogen-bonding with the inorganic nanoparticles.

8. The liquid polymerizable composition according to claim 1, wherein the chain-growth polymerization dispersing monomer comprises an acrylate group, a methacrylate group, an acrylamide group, a methacrylamide group, an acrylic thioester group or a methacrylic thioester group.

9. An optical article comprising:
   an optical substrate, and
   a coating obtained by curing of the liquid polymerizable composition according to claim 1.

10. An optical article obtained by curing the liquid polymerizable monomer composition according to claim 1.

11. The optical article according to claim 9, wherein the article exhibits a refractive index that is higher than 1.56.

12. The optical article according to claim 9, wherein the article exhibits a haze value at 545 nm that is lower than 6%.

13. A method for decreasing the haze value of a liquid polymerizable composition after curing, said liquid polymerizable composition, comprising:
   a chain-growth polymerization dispersing monomer comprising one or two C=C bond(s),
   inorganic nanoparticles dispersed therein; and
   wherein a step-growth polymerization monomer system comprising a polyene monomer and a polythiol monomer is added to said liquid polymerizable composition,
   wherein the molar ratio of C=C bonds in the polyene monomer divided by the sum of C=C bond in the polyene monomer and thiol groups in the polythiol monomer is above 60% and below 95%,
   wherein the inorganic nanoparticles are chosen from zinc sulphide and zirconia,
   wherein the amount of inorganic nanoparticles in the polymerizable composition is at least 20%, by weight based on the weight of the composition, and
   wherein the amount of the chain-growth polymerization dispersing monomer is from 30 to 45%, by weight based on the weight of the composition.

14. The optical article according to claim 10, wherein the article exhibits a refractive index that is higher than 1.56.

15. The liquid polymerizable composition according to claim 1, wherein after curing, said composition is suitable for use as an optical lens or as a coating in an optical lens comprising an optical substrate.

16. The liquid polymerizable composition according to claim 15, wherein the optical lens is an ophthalmic lens.

17. The liquid polymerizable composition according to claim 1, wherein after curing, said composition is suitable for use as an optical element for a camera.

18. The liquid polymerizable composition according to claim 1, wherein the polyene monomer is chosen from bisphenol A diacrylate, ethoxylated bisphenol A diacrylate, bisphenol A dimethacrylate, ethoxylated bisphenol A dimethacrylate, diacrylate derivatives of bisphenol S, dimethacrylate derivatives of bisphenol S, and mixtures thereof.

19. The liquid polymerizable composition according to claim 1, wherein the polythiol monomer is selected in the group consisting of 2,2'-oxydiethanethiol, 2,2'-thiodiethanethiol, 2,2'-(ethylenedioxy)diethanethiol, hexa(ethylene glycol)dithiol, 3,6-dioxa-1,8-octanedithiol, glycol dimercaptoacetate, diethylene glycol bis (2-mercaptoacetate), dl-1,4-dithiothreitol, bis(2-mercaptoethyl)sulphide (B2MS), bis(2-mercaptoethyl)sulphone, 5-({2-[(5-mercapto-1,3,4-thiadiazol-2-yl)thio]ethyl}thio)-1,3,4-thiadiazole-2-thiol, dithioglycerol, trithioglycerol, and mixtures thereof.

* * * * *